United States Patent [19]

Takahashi et al.

[11] Patent Number: 6,070,081
[45] Date of Patent: *May 30, 2000

[54] PRIVATE MOBILE COMMUNICATION SYSTEM EASILY CONNECTING PORTABLE OR MOBILE RADIO TELEPHONE EQUIPMENT TO PUBLIC NETWORK

[75] Inventors: Katsumi Takahashi, Saitama; Yoshinori Uchida, Hyogo, both of Japan

[73] Assignees: NTT Mobile Communications Network, Inc.; Mitsubishi Denki Kabushiki Kaisha, both of Tokyo, Japan

[*] Notice: This patent is subject to a terminal disclaimer.

[21] Appl. No.: 08/974,676

[22] Filed: Nov. 19, 1997

Related U.S. Application Data

[63] Continuation-in-part of application No. 08/910,235, Aug. 13, 1997, Pat. No. 5,870,677, which is a continuation of application No. 08/418,871, Apr. 7, 1995, abandoned, which is a continuation-in-part of application No. 08/130,850, Oct. 4, 1993, abandoned.

[30] Foreign Application Priority Data

Oct. 5, 1992 [JP] Japan ................................. 4-265892

[51] Int. Cl.[7] .................................................. H04Q 7/24
[52] U.S. Cl. ........................ 455/463; 455/426; 455/555
[58] Field of Search .................................. 455/403, 410, 455/411, 422, 426, 461–463, 550, 552, 555; 379/156–157, 158

[56] References Cited

U.S. PATENT DOCUMENTS

| | | | |
|---|---|---|---|
| 4,833,702 | 5/1989 | Shitara et al. | 455/465 |
| 4,955,050 | 9/1990 | Yamauchi | 455/555 |
| 5,274,698 | 12/1993 | Jang | 379/198 |
| 5,315,636 | 5/1994 | Patel | 455/461 |
| 5,353,331 | 10/1994 | Emery et al. | 455/461 |
| 5,406,615 | 4/1995 | Miller, II et al. | 455/552 |
| 5,448,619 | 9/1995 | Evans et al. | 455/426 |
| 5,479,483 | 12/1995 | Furuya et al. | 455/433 |
| 5,870,677 | 2/1999 | Takahashi et al. | 455/463 |

*Primary Examiner*—William G. Trost
*Attorney, Agent, or Firm*—Rothwell, Figg, Ernst & Kurz

[57] ABSTRACT

A private mobile communication system serves to support communication between mutual portable or mobile radio telephone equipment which are registered in the system, and communication between the portable or mobile radio telephone communication equipment and telephones connected to a public communication network. Portable or mobile radio telephone equipment which is not registered in the system transmits a call request to the public network through a private control channel controlling section. A radio base station of the system transfers the call request through a private channel to a private branch exchange (PBX). The PBX serves to support the call to the public network in response to the call request transmitted through the private channel.

2 Claims, 20 Drawing Sheets

FIG.6 (PRIOR ART)
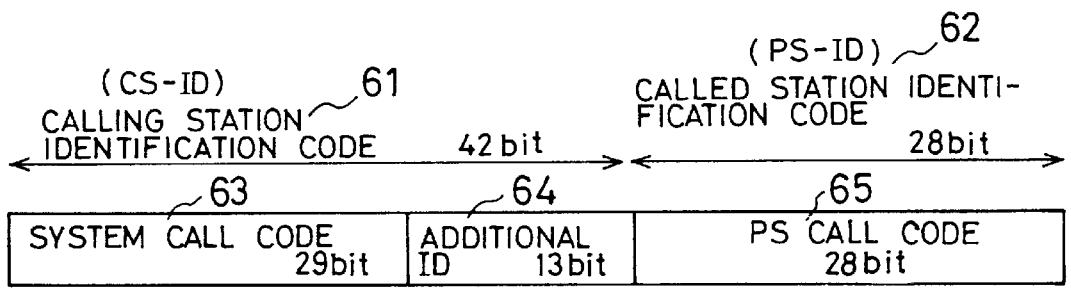
(a) PRIVATE SYSTEM (CS→PS)
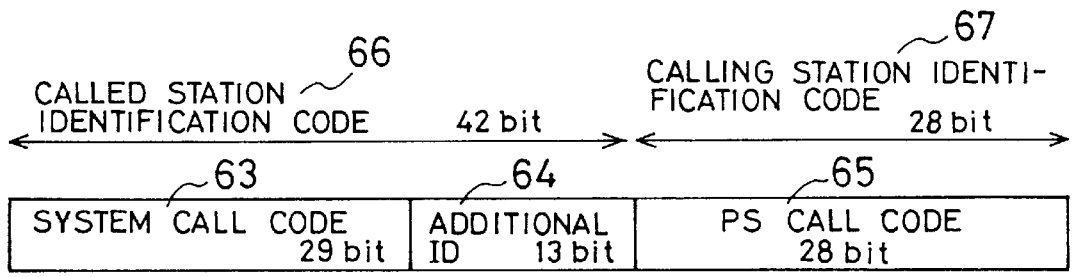
(b) PRIVATE SYSTEM (PS→CS)
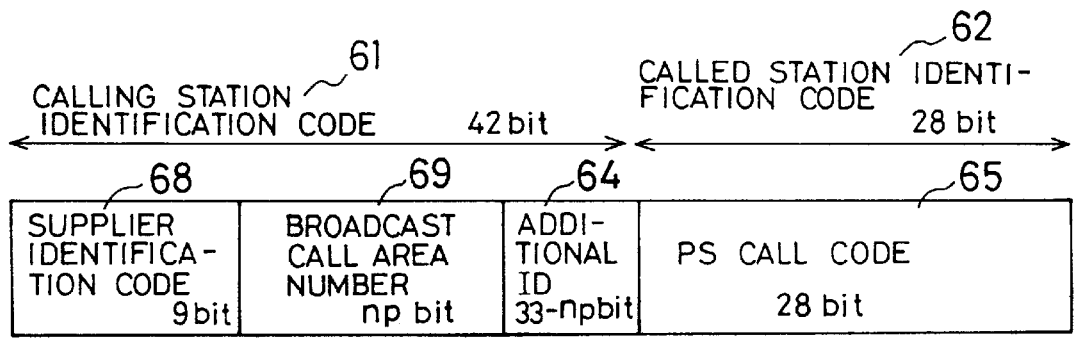
(c) PUBLIC SYSTEM (CS→PS)
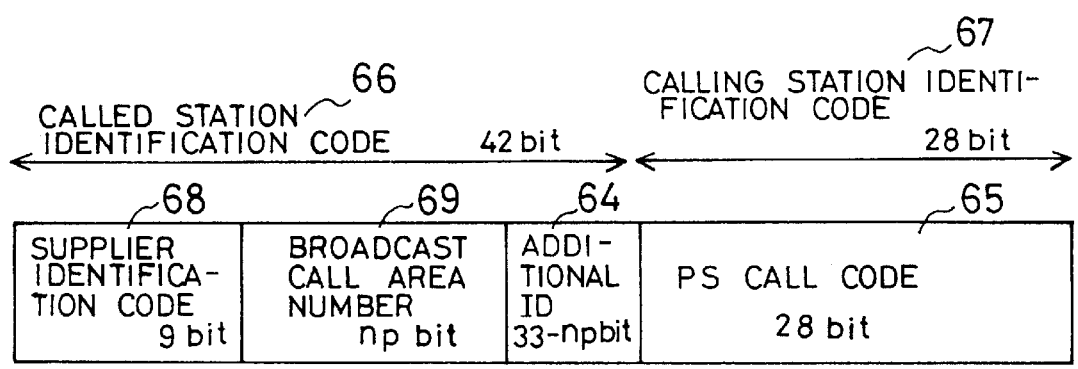
(d) PUBLIC SYSTEM (PS→CS)

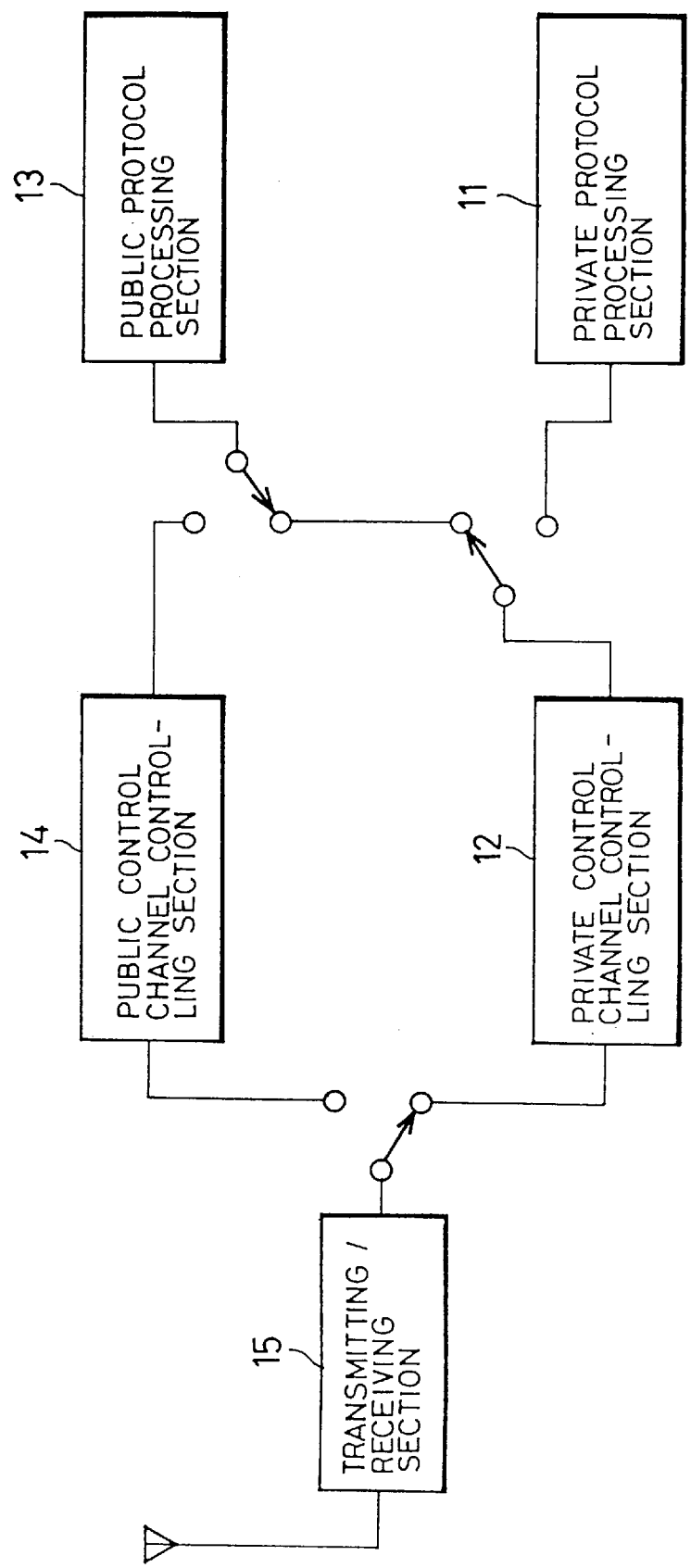

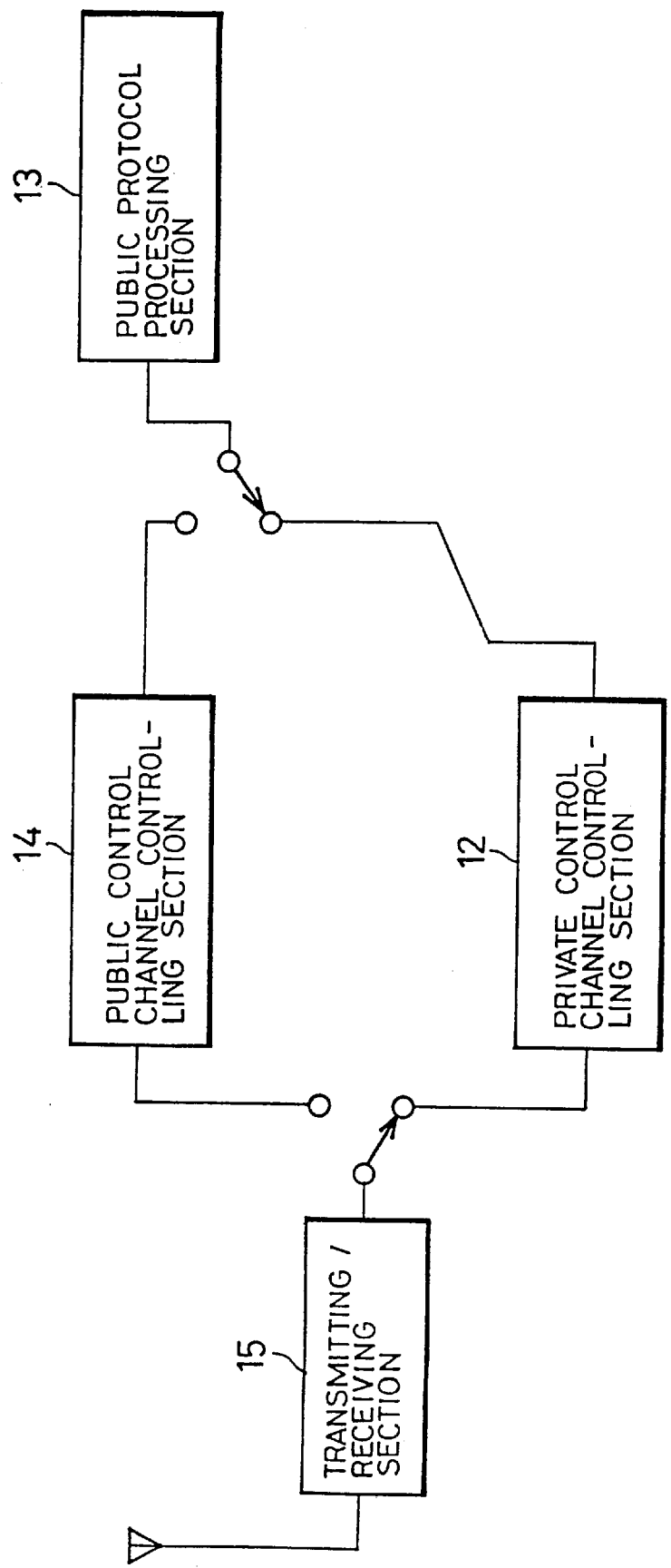

AFTER LINK CHANNEL ESTABLISHMENT
(IN CASE OF CALL FROM PS)

6,070,081

PRIVATE MOBILE COMMUNICATION SYSTEM EASILY CONNECTING PORTABLE OR MOBILE RADIO TELEPHONE EQUIPMENT TO PUBLIC NETWORK

CROSS REFERENCE TO RELATED APPLICATIONS

This application is a continuation-in-part of application Ser. No. 08/910,235, filed Aug. 13, 1997, U.S. Pat. No. 5,870,677 which in turn is a continuation of application Ser. No. 08/418,871, filed Apr. 7, 1995 (now abandoned), which in turn is a continuation-in-part of application Ser. No. 08/130,850, filed Oct. 4, 1993 (now abandoned).

BACKGROUND OF THE INVENTION

1. Field of the Invention

The present invention relates to a mobile communication system enabling connection of a plurality of portable or mobile radio telephone equipment which do not belong to the system to a public network.

2. Description of the Prior Art

FIG. 1 is a system configuration diagram showing a conventional private mobile communication system, hereinafter referred to as a private system. In FIG. 1, reference numeral 1 means a public network to which the mobile communication system is connected, and 2 means a private system. Reference numeral 30 means a private branch exchange (hereinafter referred to as PBX) serving as an exchange for the private system. For example, an electronic exchanging apparatus is employed as the PBX 30. Reference numeral 40 means each radio base station which is accommodated in the PBX 30 and has each predetermined zone, and 50 means a portable or mobile radio telephone equipment which is carried by a user, and is connected to the radio base station 40 by radio, and is also connected to the radio base station 40B directly connected to the public network 1 by radio.

FIG. 2 is a functional block diagram showing a configuration of the portable radio telephone equipment 50. In FIG. 2, reference numeral 11 means a private protocol processing section to process a private protocol of the private system 2, and 12 means a private control channel controlling section to control a private control channel for private protocol transmission. Reference numeral 13 means a public protocol processing section to process a public protocol in relation to the public network 1, and 14 means a public control channel controlling section to control a public control channel for public protocol transmission. Reference numeral 15 means a transmitting/receiving section which is switched over, and is connected to either the private control channel controlling section 12 or the public control channel controlling section 14.

The private protocol processing section 11 connects the portable or mobile radio telephone equipment 50 to the private mobile communication system. The public protocol processing section 13 connects the portable radio telephone equipment 50 to the public network 1. That is, the portable or mobile radio telephone equipment 50 can be connected to both the private communication system and the public network 1.

For example, in case the private communication system is installed in a department store, an employee of the department store can use the portable radio telephone equipment 50 to perform local communication with another employee. Typically, the employee has access to the public network 1 through the private communication system, and also has direct access to the public network 1.

A portable radio telephone equipment which is carried by a customer of the department store is constructed as in the portable radio telephone equipment 50. However, a customer's private protocol processing section 11 is used for, for example, communication between a primary telephone and a secondary telephone for domestic use. Thus, the customer's portable radio telephone equipment does not allow the access to the private communication system of the department store.

FIG. 3 is a functional block diagram showing a configuration of the radio base station 40. In FIG. 3, reference numeral 21 means a transmitting/receiving section which is connected to the transmitting/receiving section 15 of the portable or mobile radio telephone equipment 50 by radio, and 22 means a private control channel controlling section to control a private control channel. Reference numeral 23 means a private protocol processing section to process a private protocol, and 24 means a line processing section to perform connection to the PBX 30. The radio base station 40 does not include a public protocol processing section to process a public protocol.

On the other hand, the radio base station 40B directly connected to the public network 1, includes a public protocol processing section, but does not include a private protocol processing section.

FIG. 4 is a functional block diagram showing a configuration of the PBX 30. In FIG. 4, reference numeral 31 means a line interface connected to the radio base stations 4, and 32 means a system discriminating function section to discriminate a call of the portable or mobile radio telephone equipment 50 that belongs to an own system from a call of the portable or mobile radio telephone equipment that belongs to another system or the domestic portable or mobile radio telephone equipment. Reference numeral 33 means a private protocol control section to control transmission from the system discriminating function section 32 in case it is decided by the system discriminating function section 32 that the call is sent from the own system. Reference numeral 34 is a transmission stopping section to stop the transmission from the system discriminating function section 32 in case it is decided by the system discriminating function section 32 that the call is sent from another system. Further, reference numeral 35 means a network interface to connect the private protocol control section 33 to the public network 1.

A description will now be given of the operation. The requests for connection to the public network 1 from the respective portable or mobile radio telephone equipment 50 are processed in the respective public protocol processing sections 13. The public control channel controlling section 14 permits direct access to the public network through the transmitting/receiving section 15 in response to the request for connection. Therefore, authentication and accounting at the time are performed in the public protocol processing section of the portable or mobile radio telephone equipment 50.

On the other hand, the requests for connection to the private mobile communication system from the respective portable or mobile radio telephone equipment 50 are processed in the respective private protocol processing sections 11, and are sent to the respective private control channel controlling sections 12. Accordingly, through the transmitting/receiving section, the private control channel controlling sections 12 allow access to the radio base station 40 in charge of a zone in which the portable or mobile radio telephone equipment 50 exists. In the radio base station 40, the request for connection is received by the transmitting/ receiving section 21, and is sent to the private protocol processing section 23 through the private control channel controlling section 22. Further, the request for connection is sent out to the PBX 30 through the line processing section 24.

As an example, FIG. 5 shows process in the public protocol processing section 13. The process is disclosed in FIG. 4.4.3.8.1 which is shown in Second Generation Wireless Telephone System, 1st Ed. Standard, RCR STD-28 (hereinafter referred to as RCR STD-28) published by Research and Development Center for Radio Systems. In FIG. 5, a sequence designated by CC, RT, and MM in a batch transmission controlling sequence is shown. The private protocol processing section 11 also requires the same process as that in the public protocol processing section 13.

FIG. 6 shows formats of call signals shown in FIG. 4.2.20 of RCR STD-28. As shown in FIG. 6, the format in the private system is significantly different from the format in the public system. The private control channel controlling sections 12 incorporates a calling station identification code and a called station identification code in the private system shown in FIGS. 6(a) and 6(b) into a control physical slot. The public control channel controlling section 14 similarly incorporates a calling station identification code and a called station identification code in the public system shown in FIGS. 6(c) and 6(d) into the control physical slot.

The PBX 30 has a function to enable access to only the private control channel in response to the call out and the call in from the private mobile communication system. The request for connection from the respective radio base stations 40 is received by the line interface 31, and is sent to the system discriminating function section 32. The system discriminating function section 32 discriminates whether the request for connection is sent from the portable or mobile radio telephone equipment 50 which is registered in the private system or the request for connection is sent from a portable or mobile radio telephone equipment in another private mobile communication system or from a domestic portable or mobile radio telephone equipment. As a result, in case it is decided that the request for connection is sent from a portable or mobile radio telephone equipment which is not registered in the private system, the transmission stopping section 34 stops transmission in response to the request for connection.

Therefore, when the customer in the department store intends to have access to the PBX 30 by using the portable radio telephone equipment which is carried by the customer, the transmission is stopped.

FIG. 7 shows a frequency map at this time. In FIG. 7, the ordinate axis means each frequency at which each slot is positioned, and the transverse axis means each purpose for which each slot is used, i.e., whether each slot is used for private purpose or for public purpose. Thus, for example, a control physical slot positioned between frequencies f1 (MHZ) and f2 (MHZ) corresponds to frequency which is set by the private control channel controlling section 12, and a control physical slot positioned between frequencies f3 (MHZ) and f4 (MHZ) corresponds to frequency which is similarly set by the public control channel controlling section 14.

On the other hand, in case the system discriminating function section 32 determines that the request for connection is sent from the portable or mobile radio telephone equipment 50 which is registered in the private system, the PBX performs connection in a system when the request for connection is a request for connection in the system. Otherwise, when the request for connection is a request for public connection, the private protocol control section 33 in the PBX 30 transmits a signal to the public network 1 through the network interface 35. When the signal is transmitted to the public network 1, the PBX 30 itself performs the authentication and accounting.

Techniques relevant to the conventional mobile communication system as described before are disclosed in, for example, Japanese Patent Application Laid-Open No. 2-192329.

The conventional private mobile communication system is provided as set forth above. Consequently, the portable or mobile radio telephone 50 that belongs to the system allows the access to the public network 1 through the PBX 30, and also enables the direct access to the public network 1. However, the portable or mobile radio telephone equipment which does not belong to the system does not permit the access to the public network 1 through the PBX 30.

That is, in order to provide the access to the public network 1 by using the portable or mobile radio telephone equipment which does not belong to the system, the direct access is the only practical way. Therefore, in case there is no radio base station in the public network 1 in the vicinity of the portable or mobile radio telephone equipment, the portable or mobile radio telephone equipment does not permit the access to the public network 1 even if the portable or mobile radio telephone equipment is in a condition to enable the access to the radio base station 40 in the private mobile communication system.

For example, in case the customer comes to the department store with a portable radio telephone equipment, the equipment does not permit the access to the public network 1 unless the equipment allows the access to the radio base station in the public network 1.

SUMMARY OF THE INVENTION

The present invention is made in order to overcome the problems as set forth above. It is an object of the present invention to provide a private mobile communication system enabling public transmission from a portable or mobile radio telephone equipment which does not belong to a system in a zone of a radio base station in the private mobile communication system.

According to the first aspect of the present invention, for achieving the above-mentioned object, there is provided a mobile communication system in which a portable or mobile radio telephone equipment and a radio base station have a function to transmit a public protocol through a private control channel, a PBX transmits the public protocol which is transmitted by the portable or mobile radio telephone equipment through the private control channel, identification and position registration are performed in case of the portable or mobile radio telephone equipment in a private system by using the subscriber's telephone number thereof, and related information relating to a portable or mobile radio telephone equipment that belongs to a different system are directly transferred. Consequently, in the mobile communication system according to the first aspect of the present invention, it is possible to enable public connection through a radio base station in a system to which the portable or mobile radio telephone equipment does not belong even in an area where any public base station is not built.

It is thus possible to enable such other public connection without rendering accounting to the system through a private control channel controlling section and a public protocol processing section of the system to which the portable or mobile telephone equipment belongs even in an area where any public base station does not exist and even if the system can connect the telephone equipment to the public network through the private control channel controlling section and the private protocol processing section of the system. Thus, authentication and accounting for the telephone which does not belong to the system is available directly from the public network when the non-system telephone accesses the public network to which it does not belong.

According to the second aspect of the present invention, there is provided a mobile communication system in which, in case a position of a portable or mobile radio telephone equipment which does not belong to a private system is registered, a PBX stores an address of a radio base station in charge of a zone including the current position of the portable or mobile radio telephone equipment. A public network registers a position of the PBX as the position of the portable or mobile radio telephone equipment In response to a call in from the public network to the portable or mobile radio telephone equipment which does not belong to the private system, the PBX calls the portable or mobile radio telephone equipment through the radio base station in which the address corresponding to the portable or mobile radio telephone equipment is stored. Consequently, in the mobile communication system according to the second aspect of the present invention, it is possible to enable the call in from the public network through the radio base station in a system in which the portable or mobile radio telephone equipment does not belong even in an area where any public base station is not built.

According to the third aspect of the present invention, there is provided a mobile communication system in which a PBX restricts a call out to a public network when a ratio of connection with the public network to line capacity of a radio base station reaches a predetermined rate. Consequently, it is possible to prevent incapability of connection of a call in a private system due to excessive connection of a public call to the radio base station.

According to the fourth aspect of the present invention, there is provided a mobile communication system in which a PBX restricts a call to a public network by setting a different ratio for each radio base station. Consequently, it is possible to provide great operational flexibility in the system.

According to the fifth aspect of the present invention, there is provided a mobile communication system in which, when a portable or mobile radio telephone equipment in another system calls a portable or mobile radio telephone equipment in a private system or the portable or mobile radio telephone equipment in the private system calls the portable or mobile radio telephone equipment in another system, a PBX transmits the call signal to the portable or mobile radio telephone equipment in another system or to the portable or mobile radio telephone equipment in the private system instead of transmitting the call signal to a public network.

Consequently, it is possible to avoid useless occupation of a line between the exchange and the public network.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 6 is an explanatory view showing calling station identification codes and called station identification codes as examples;

DETAILED DESCRIPTION OF THE PREFERRED EMBODIMENTS

Figure 1:
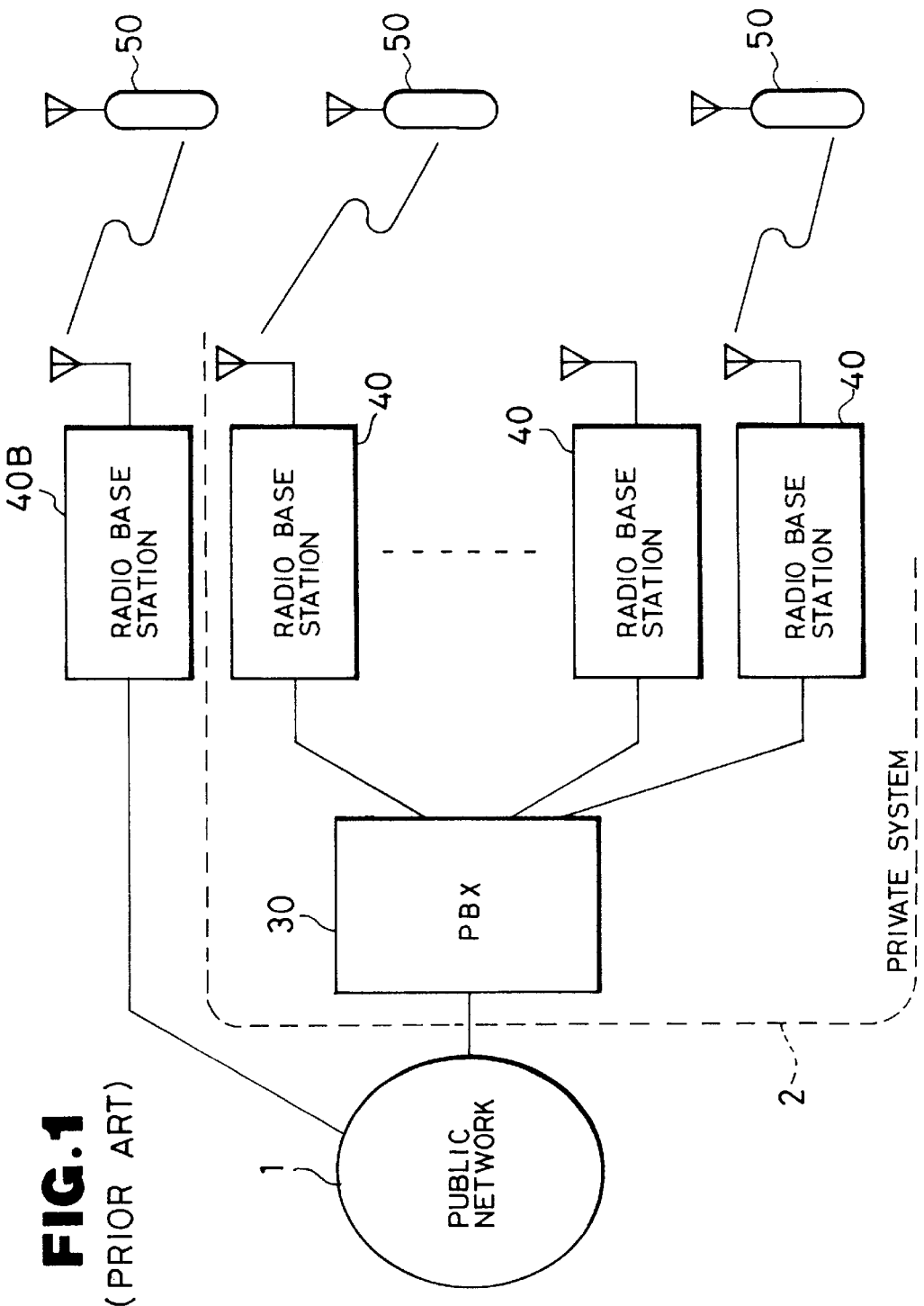
FIG. 1 is a system configuration diagram showing a conventional private mobile communication system including the radio base station connected to a public network.
Figure 2:
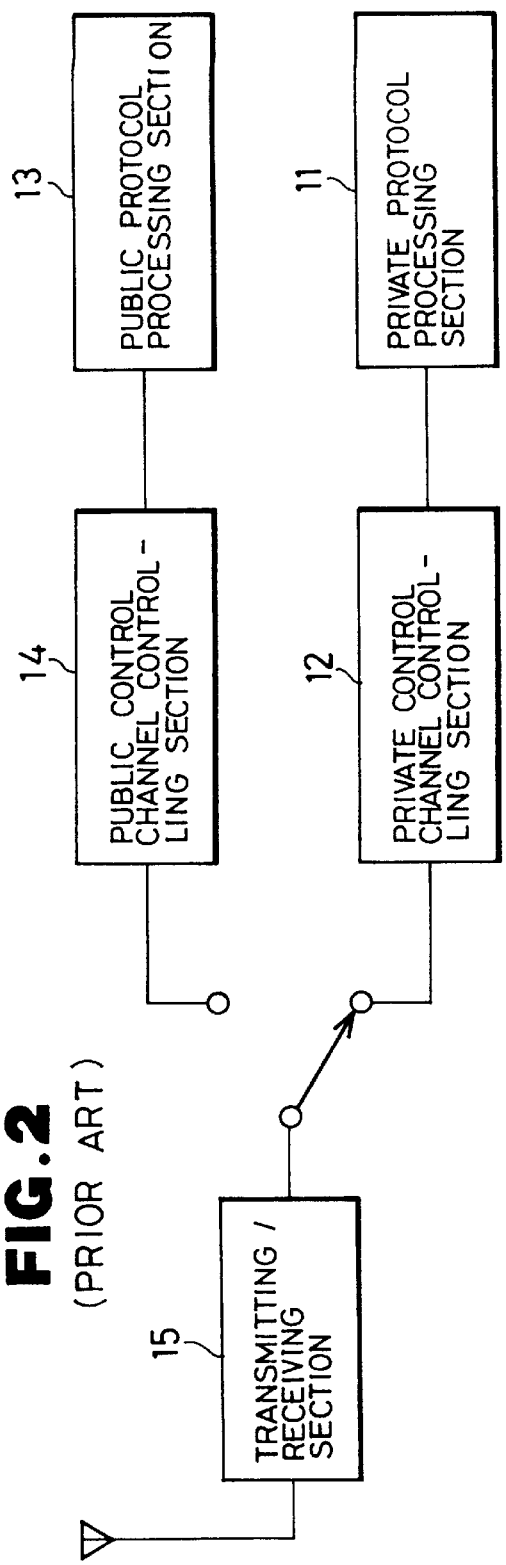
FIG. 2 is a block diagram showing a configuration of a conventional portable or mobile radio telephone equipment.
Figure 3:
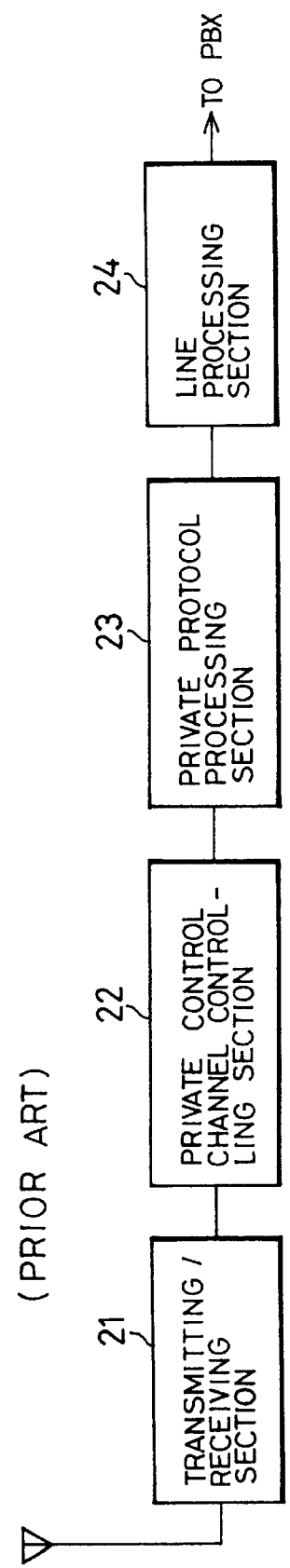
FIG. 3 is a block diagram showing a configuration of a conventional radio base station.
Figure 4:
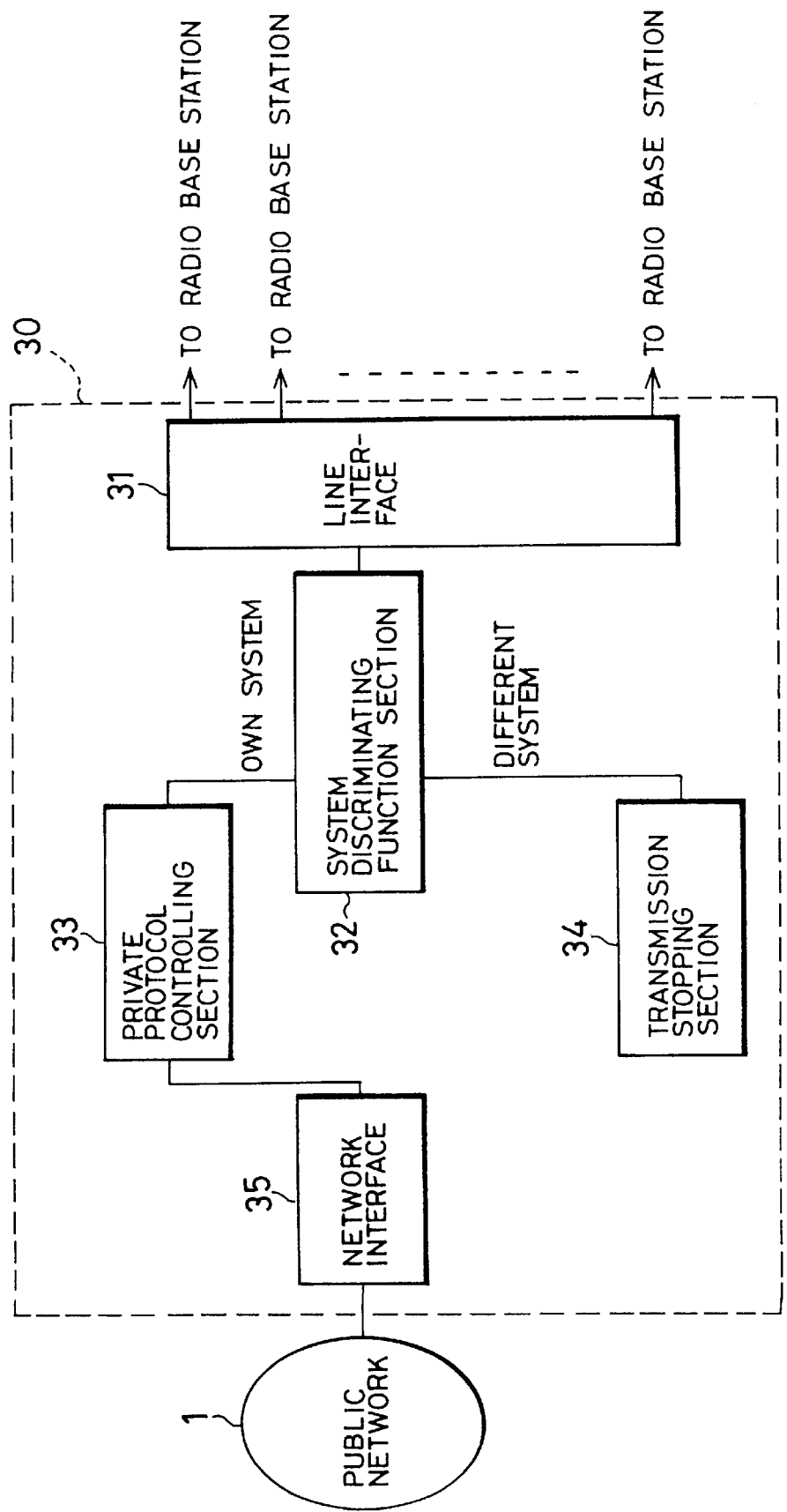
FIG. 4 is a block diagram showing a configuration of a conventional PBX.
Figure 5:
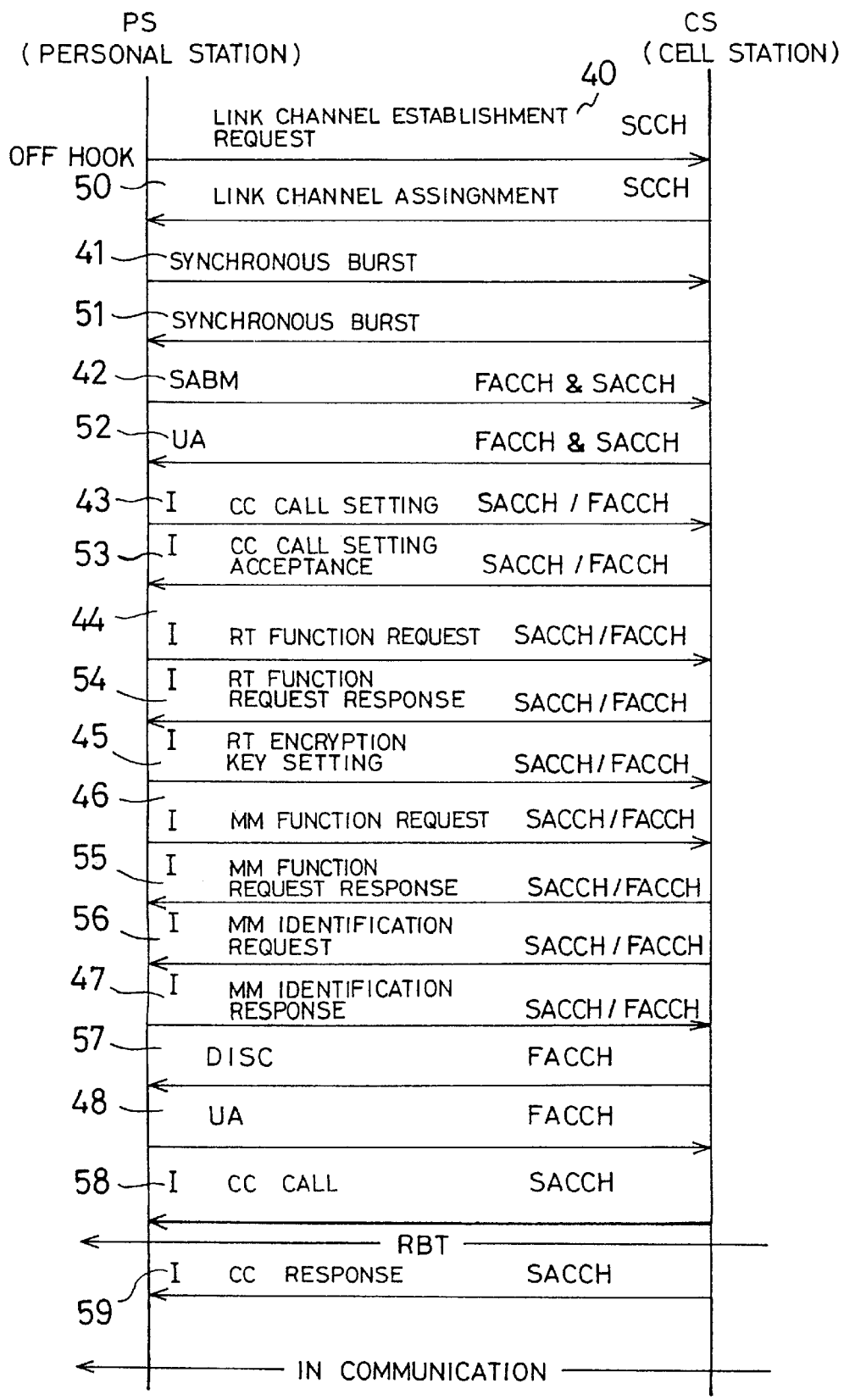
FIG. 5 is an explanatory view showing a public protocol as one example.
Figure 7:
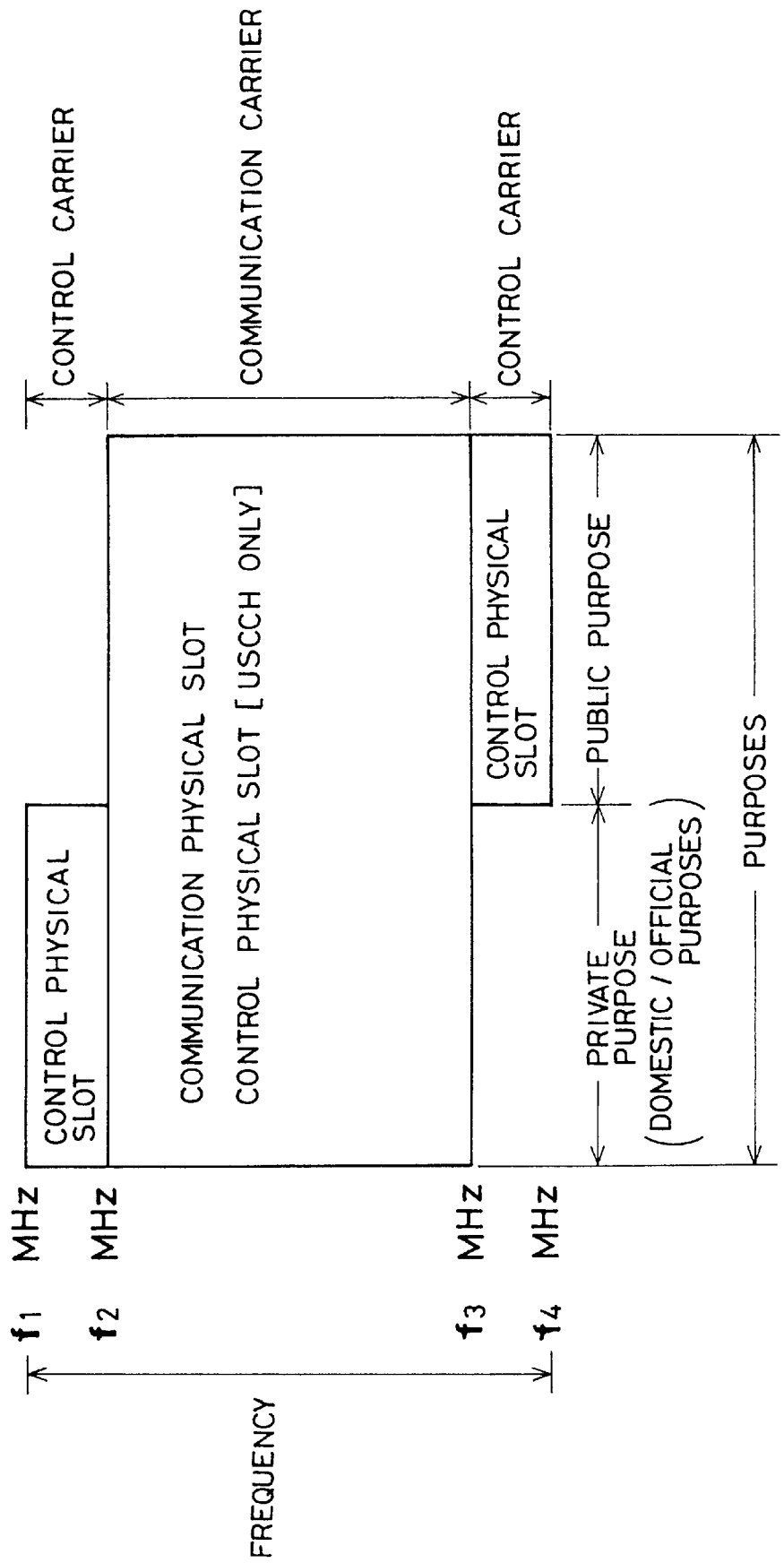
FIG. 7 is an explanatory view showing a frequency assignment as one example.
Figure 8:
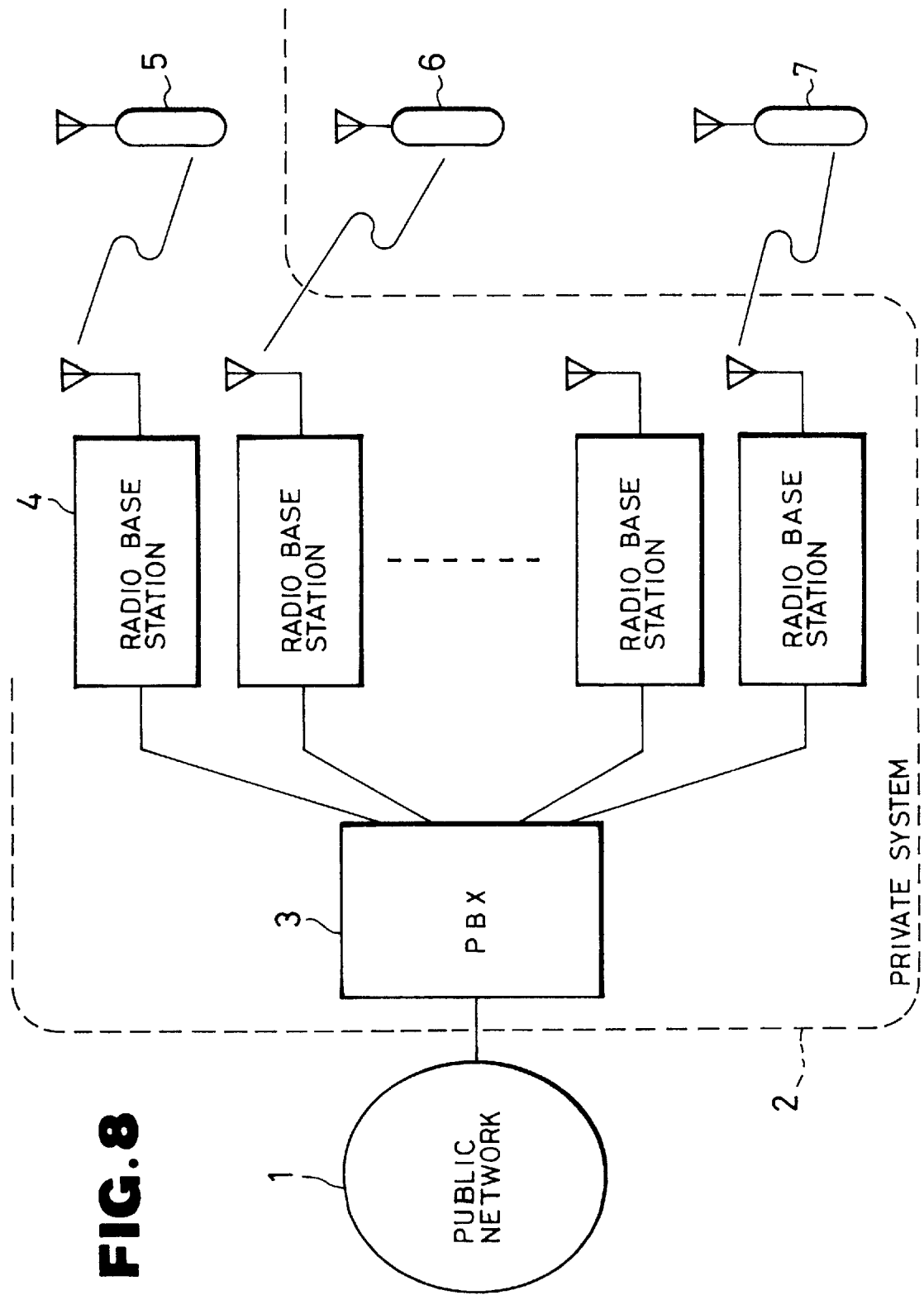
FIG. 8 is a system configuration diagram showing one embodiment of a private mobile communication system of the present invention.
Figure 9:
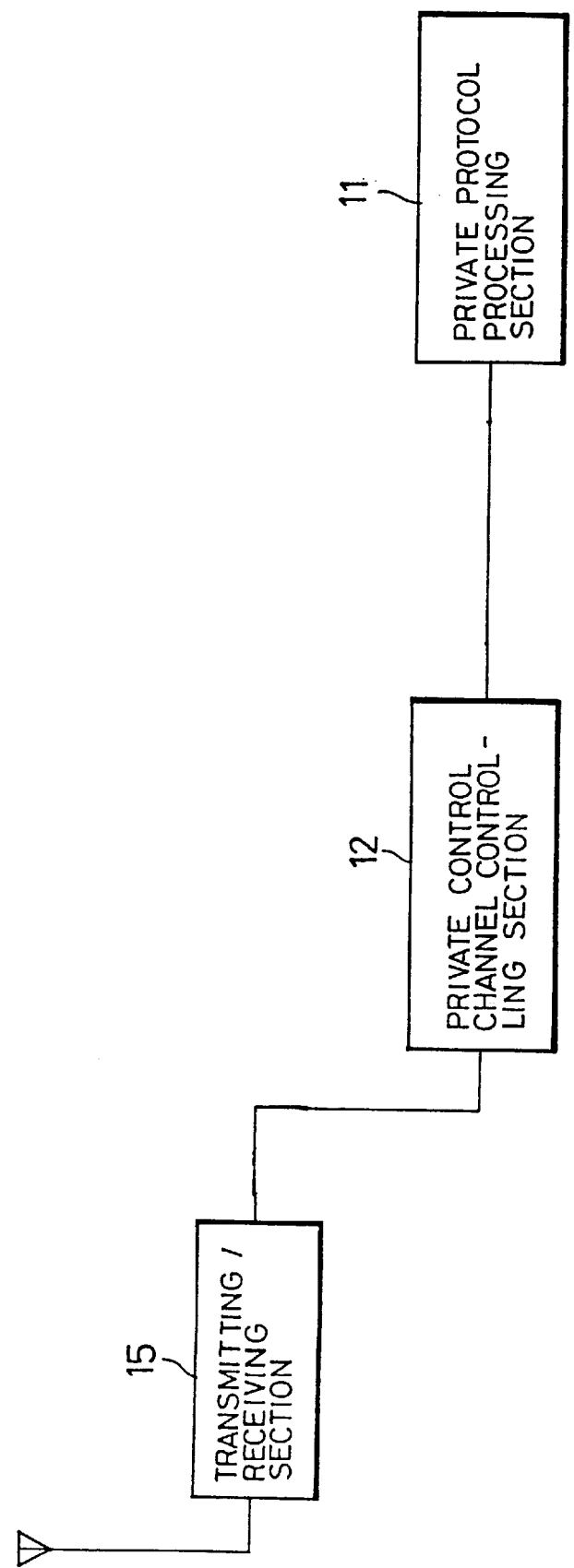
FIG. 9A is a block diagram showing a configuration of a portable or mobile radio telephone equipment which belongs to both the public network system and the private mobile communication system of FIG. 8.
FIG. 9B is a block diagram showing a configuration of a portable or mobile radio telephone equipment which belongs to only the public network system, and not the private mobile communication system of FIG. 8.
FIG. 9C is a block diagram showing a configuration of a portable or mobile radio telephone equipment which belongs to only the private mobile communication system of FIG. 8, and not the public network system.
Figure 10:
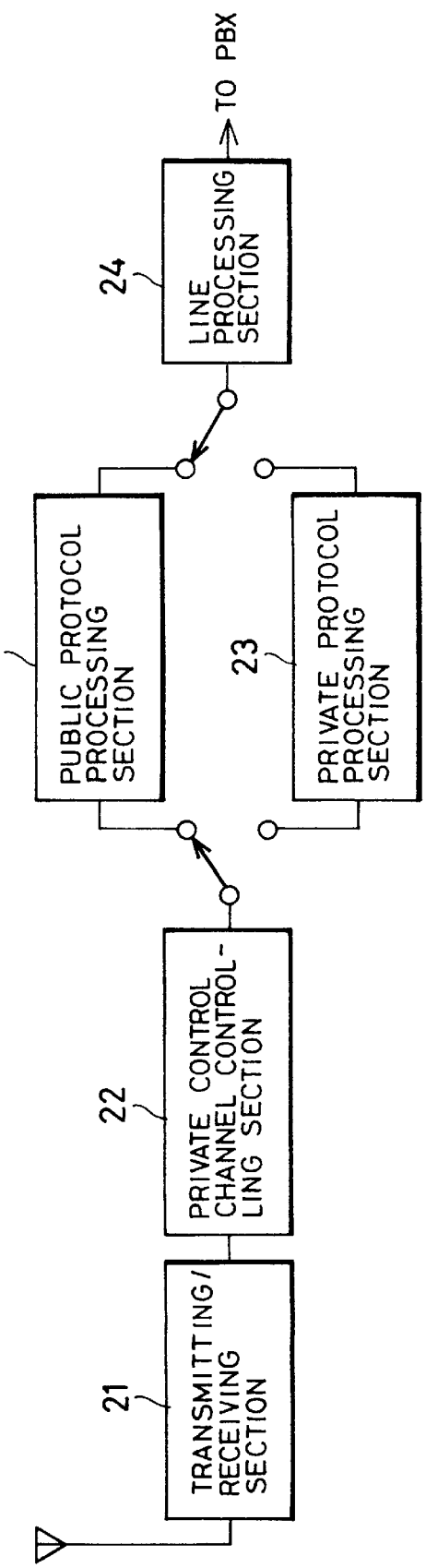
FIG. 10 is a block diagram showing a configuration of a radio base station.
Figure 11:
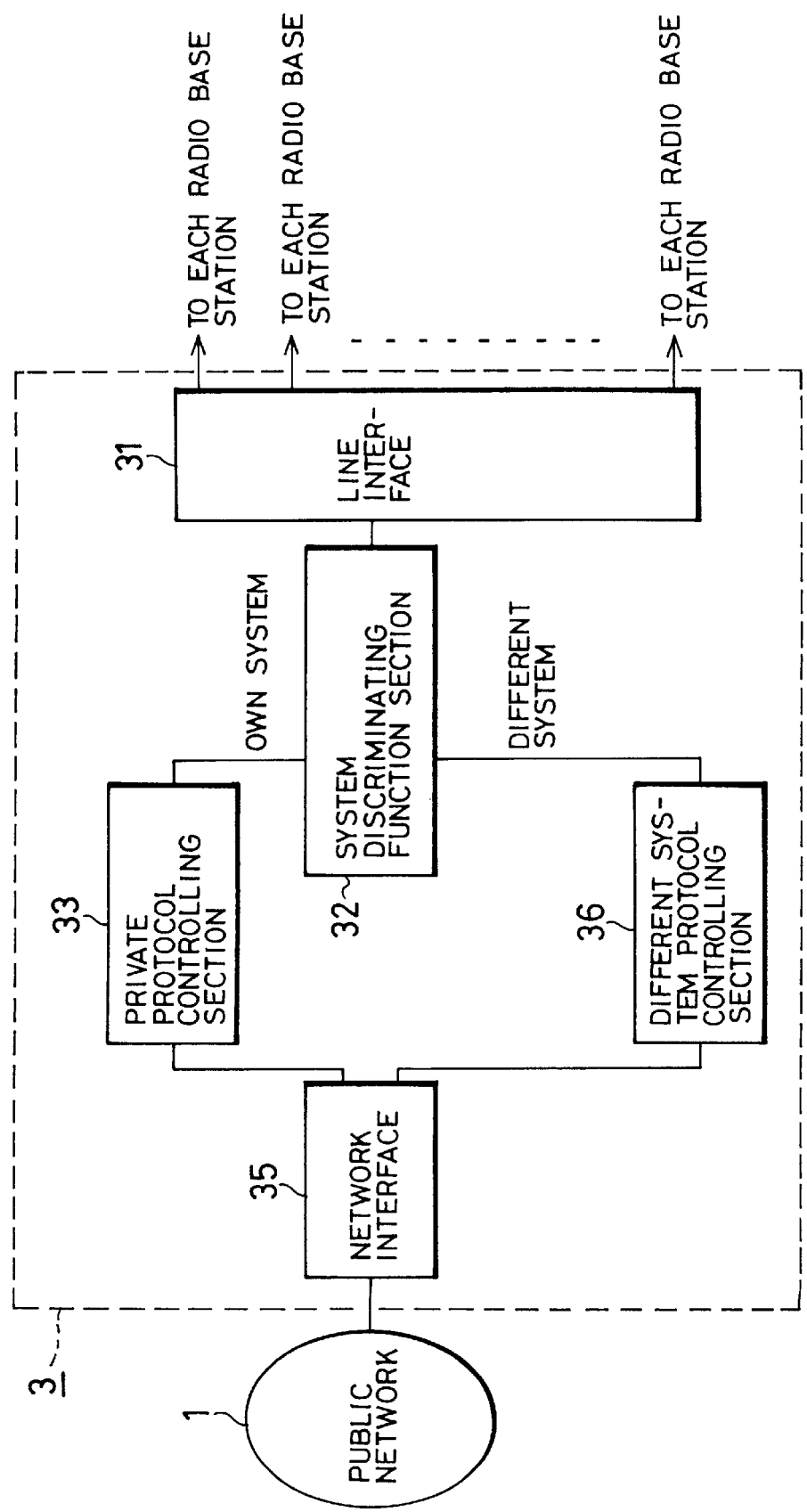
FIG. 11 is a block diagram showing a configuration of a PBX.
Figure 12:
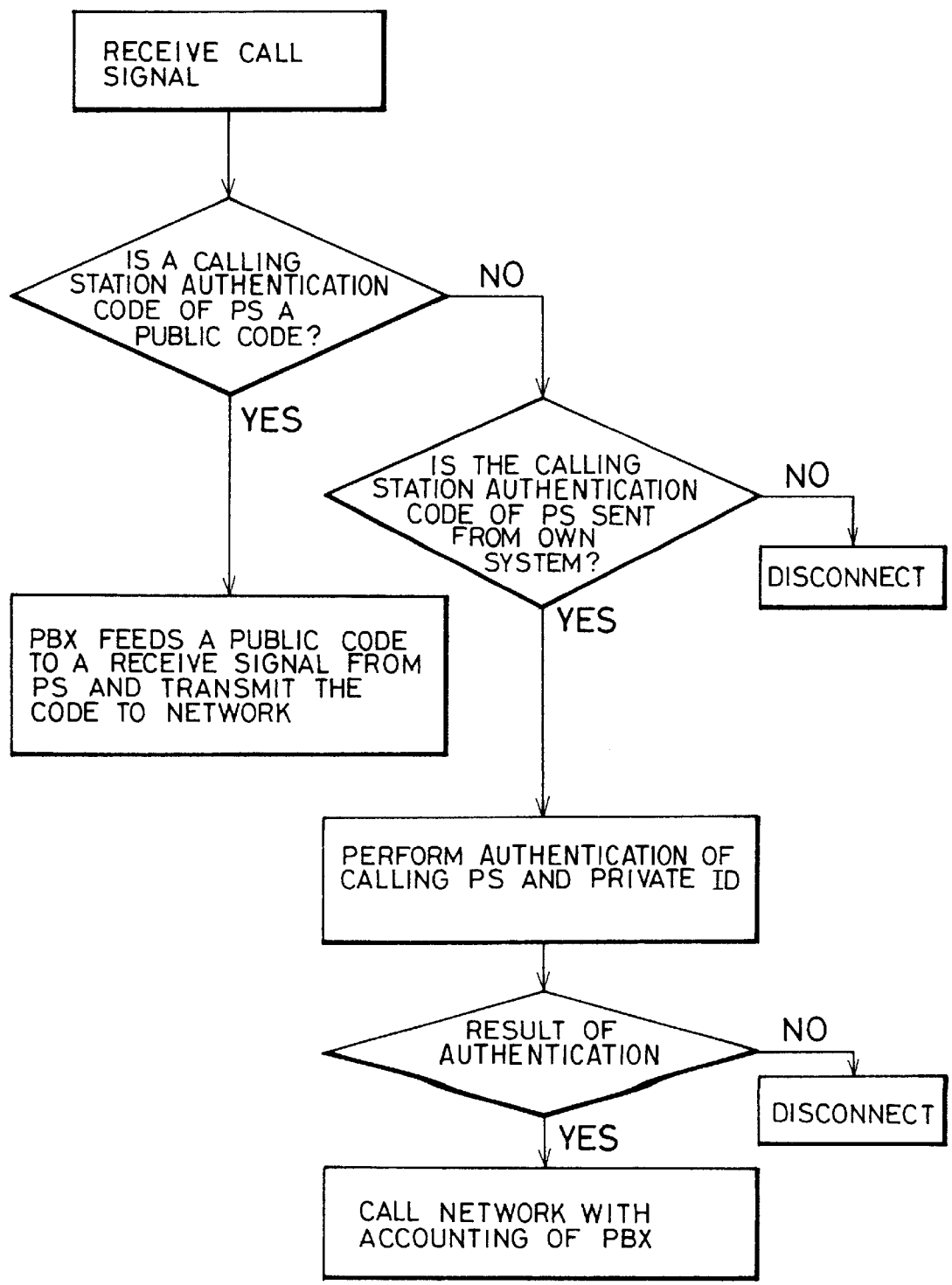
FIG. 12 is a flowchart showing an operation of the PBX.

Preferred embodiments of the invention will now be described in detail referring to the accompanying drawings. FIG. 8 is a system configuration diagram showing an entire configuration of a private mobile communication system according to an embodiment of the present invention. FIG. 9A is a functional block diagram showing one configuration of portable or mobile radio telephone equipment 5, 6, and 7 as shown in FIG. 8. FIGS. 9B and 9C show other configurations of mobile radio telephone equipment according to other embodiment of the invention. FIG. 10 is a functional block diagram showing a configuration of a radio base station 4. FIG. 11 is a block diagram showing a configuration of a PBX 3, and FIG. 12 is a flowchart showing an operation of the PBX 3.

In FIG. 8, reference numeral 5 is a portable or mobile radio telephone equipment which belongs to the private communication system 2, 6 is a portable or mobile radio telephone equipment that belongs to another system, and 7 is a domestic portable or mobile radio telephone equipment. Portable or mobile radio telephone equipment 6 and 7 do not belong to the private system 2. According to the embodiment of FIG. 9A, the portable or mobile radio telephone equipment 5, 6, and 7 shown in FIG. 8 are provided such that a public protocol processing section 13 can be connected to a private control channel controlling section 12. In this embodiment configuration of FIG. 9A is applicable both to the portable or mobile telephone equipment 5 that belongs to the system and to the portable or mobile telephone equipment 6 and 7 external to the system. Thus, in the following discussion, the portable or mobile telephone equipment 5, 6 and 7 have the same configuration shown in FIG. 9A.

For example, in case the system is installed in a department store, a customer coming to the department store uses the public protocol processing section 13 of the portable or mobile radio telephone equipment 6 or 7 to have access to a public network 1 through the PBX 3.

In the portable or mobile radio telephone equipment 5, 6, and 7, the private channel controlling section 12 and the public control channel controlling section 14 employ signal formats as shown in FIG. 6. However, in case the private control channel control section 12 is connected to the public protocol processing section 13, the private control channel controlling section 12 incorporates a calling station identification code and a called station identification code as shown in FIG. 6(d) into a physical control slot.

In the case where an employee of the department store accesses the public network 1 by using the portable or mobile telephone equipment 5, this is done in one case by connecting the private protocol processing section 11 to the private control channel controlling section 12 and in a second case by connecting the public protocol processing section 13 to the private control channel controlling section. In the former case the call accounting is charged to the system, in the latter case the accounting is charged to the employee.

In the radio base station 4, as shown in FIG. 10, a public protocol processing section 25 has a function to pass a public protocol by using a control signal into which the calling station identification code and the called station identification code in a public system as shown in FIG. 6(d) are incorporated.

In the PBX 3 as shown in FIG. 11, reference numeral 36 is a different system protocol controlling section which delivers without authentication by PBX 3 related information to the corresponding portable or mobile radio telephone equipment 6 or 7 as is in the case where a system discriminating function section 32 detects access by the portable or mobile radio telephone equipment 6 or 7 of other systems, and by the corresponding portable or mobile radio telephone 5 when the employee accesses the public network by using the public protocol processing section 13.

A description will now be given of the operation. A request for connection sent from the portable or mobile radio telephone equipment 5 that belongs to the private system is the same as a request for connection in the prior art. Accordingly, it is possible to perform the authentication and the accounting by the public protocol processing section 13 of the portable or mobile radio telephone equipment 5 In case the portable or mobile radio telephone equipment 5 is provided as shown in FIG. 9A, it is also possible to perform the authentication and the accounting by the PBX 3 in response to the request for connection to the public network 1 when the public protocol processing section 13 is connected to the private control channel controlling section 12.

In a condition where the portable or mobile radio telephone equipment 6 or 7 enable access to the radio base station of the public network 1, the public protocol processing section 13 is connected to the public control channel controlling section 14.

On the other hand, in a condition where the portable or mobile radio telephone equipment 6 or 7 do not enable access to the radio base station of the public network 1, the public protocol processing section 13 is connected to the private control channel controlling section 12. Accordingly, the request for connection to the public network 1 is processed in the public protocol processing section 13 of the portable or mobile radio telephone equipment 6 or 7 as shown in FIG. 9A, and is sent by transmitting/receiving section 15 to the radio base station 4 from private control channel controlling section 12. Further, the request for connection is received by transmitting/receiving section 21 of the radio base station as shown in FIG. 10, and is sent through the private control channel controlling section 22 to the public protocol processing section 25. After processing, the request for connection is sent from line processing section 24 to the PBX 3.

In the PBX 3, the request for connection sent from the radio base station 4 is received by a line interface 31. The system discriminating function section 32 determines whether or not the request for connection is sent from the portable or mobile radio telephone equipment that belongs to the private system. In this case, since the portable or mobile radio telephone equipment belongs to another system, the different system protocol controlling section 36 is actuated so that the different system protocol controlling section 36 transmits a signal through network interface 35. Thereafter, the different system protocol controlling section 36 allows the related information to pass as is from the public network 1 to the corresponding portable or mobile radio telephone equipment 6 or 7, and to be delivered to the portable or mobile radio telephone equipment 6 or 7. Thereby, authentication is given directly to the transmitting portable or mobile radio telephone equipment 6 or 7 by the public network 1, and the accounting is performed directly by the public network 1 with respect to the corresponding portable or mobile radio telephone equipment 6 or 7.

FIG. 9B shows a configuration of portable or mobile radio telephone equipment which belongs only to the public network system, and not to a private communication system as shown in FIG. 8. Such portable or mobile equipment contains only public protocol processing section 13. Because radio base station 4 includes a public protocol processing section 25, the radio base station 4 is able to connect the portable or mobile radio telephone equipment of FIG. 9B to public network 1, and bills the cost of communication to the portable or mobile equipment, even if the portable or mobile radio telephone equipment is within the area of the private communication system 2.

FIG. 9C shows the configuration of portable or mobile radio telephone equipment which belongs only to the private communication system 2. That is, such equipment is used only within the private communication system 2. As shown, such equipment contains only private protocol processing section 11 and private control channel controlling section 12, and is thus capable of communicating only within the private communication system 2.

In order to describe the operation of the PBX 3 in detail, FIG. 12 shows a flowchart. That is, after the PBX 3 receives the transmit signal, the system discriminating function section 32 decides whether or not a calling station identification code of a personal station (PS) is a public code based on, for example, a 9-bit supplier identification code. In case of the public code, the different system protocol controlling section 36 attaches the public code to the receiving signal from the PS so as to transmit the resultant signal to the network. On the other hand, in case of a code other than the public code, the system discriminating function section 32 decides whether or not the transmit signal is sent from the portable or mobile radio telephone equipment 5 in the private system, and transmission is stopped in case the transmit signal is not a transmit signal from the own system. In case the transmit signal is the transmit signal from the own system, the private protocol controlling section 33 performs authentication of a call PS for the private system. As a result, transmission is stopped in case the authentication of the call PS does not pass, or the transmission to the network is allowed with the accounting of the PBX in case the authentication of the call PS is passed.

Figure 13:
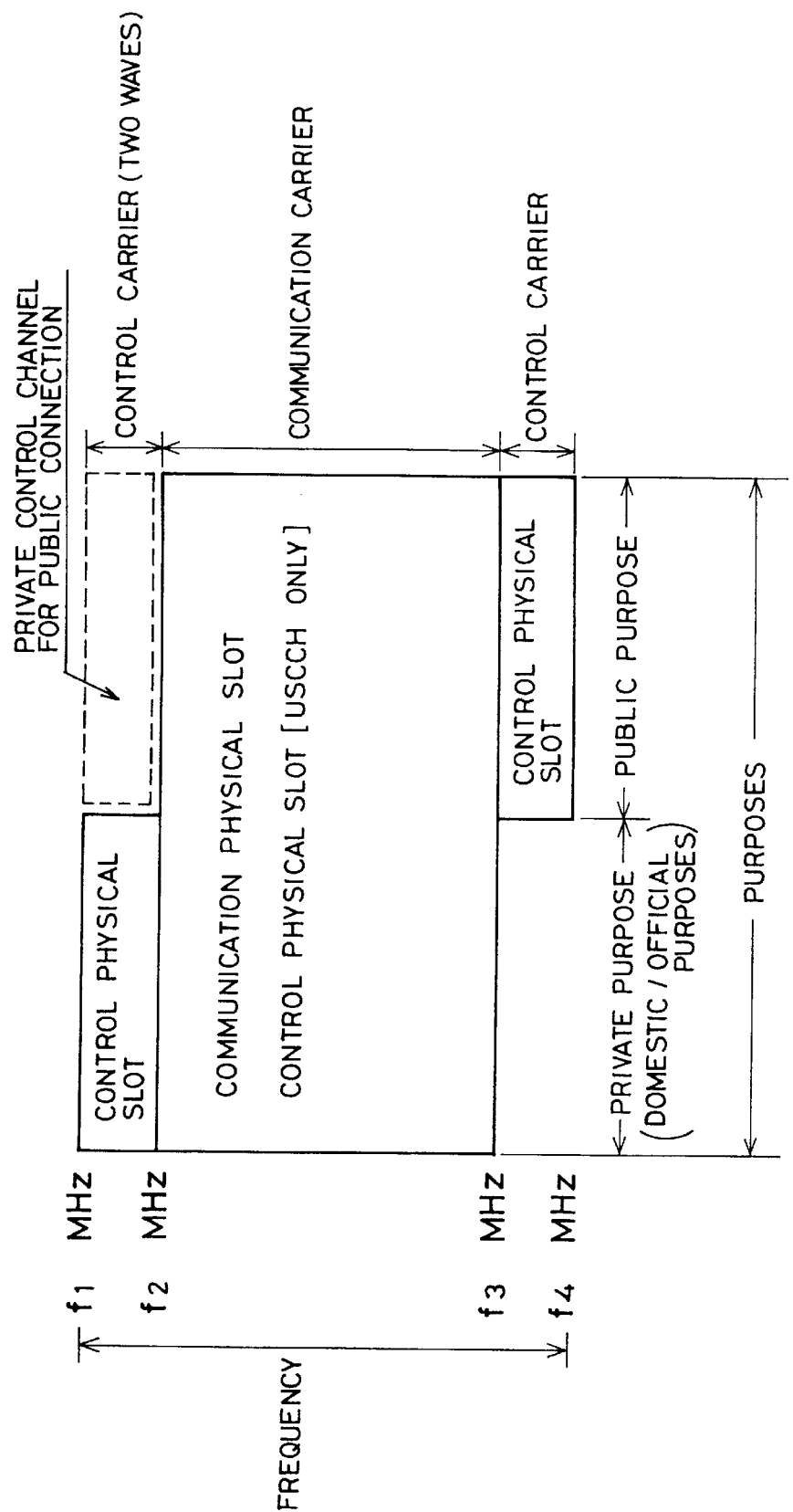
FIG. 13 is an explanatory view showing the frequency assignment as an example.

FIG. 13 shows a position of the private control channel which enables public connection on a frequency map at the time. In FIG. 13, as shown by the broken line, a range between frequencies f1 (MHz) which is assigned for a public purpose serves as an area for the private control channel which enables the public connection.

Figure 14:
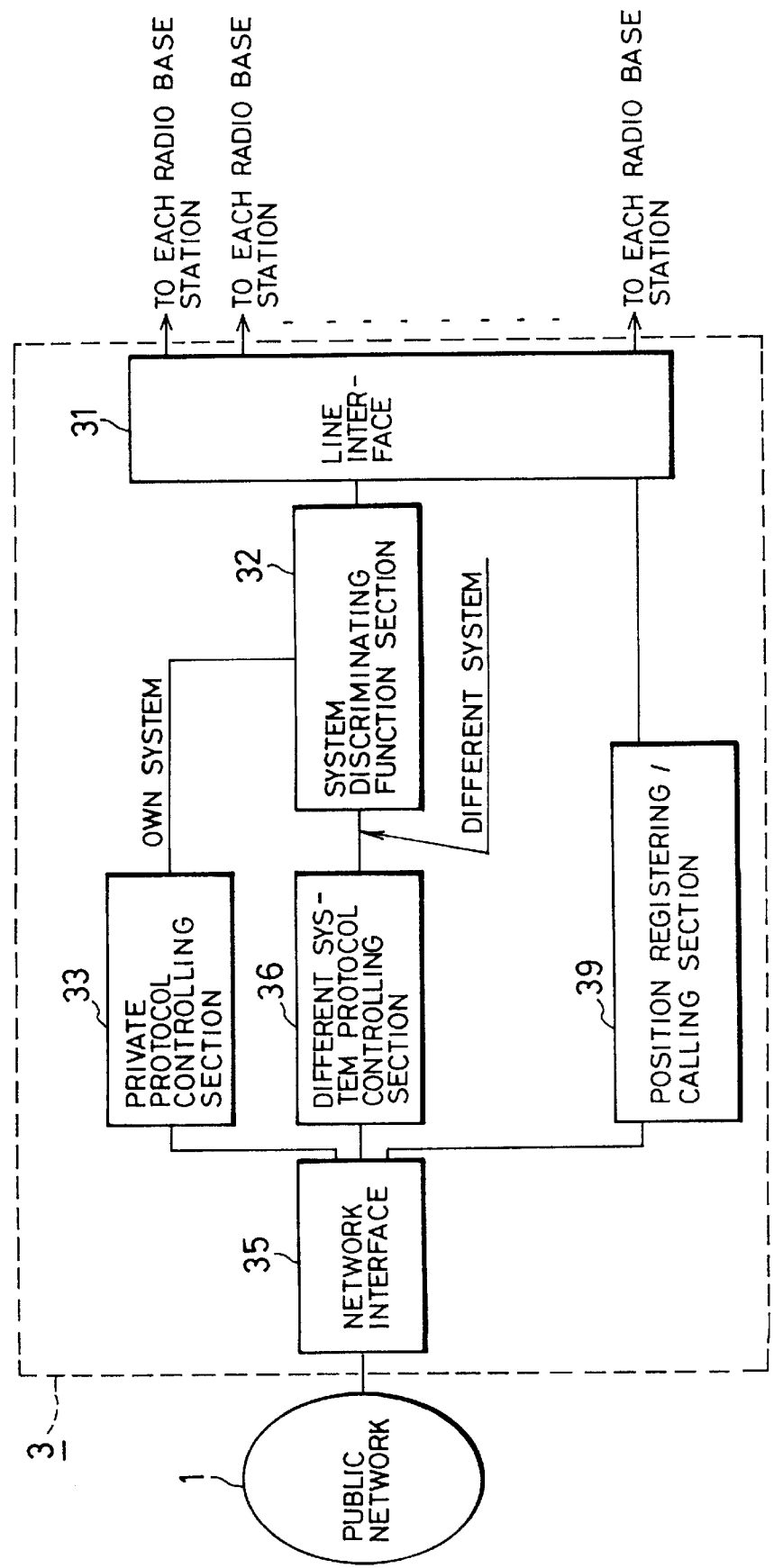
FIG. 14 is a system configuration diagram showing another embodiment of the private mobile communication system of the present invention.

Though the embodiment has been described with reference to a case where the call is generated by the portable or mobile radio telephone equipment 6 or 7 which does not belong to the private system, an incoming call may reach the portable or mobile radio telephone equipment 6 or 7. Accordingly, a description will now be given of the incoming call to the equipment 6 or 7 with reference to FIG. 14.

In order to perform the incoming call in to the portable or mobile radio telephone equipment 6 or 7 which does not belong to the private system, a position of the portable or mobile radio telephone equipment 6 or 7 is to be first registered. The position registration is performed o the side of the public network 1 through the PBX 3. As a result, information that the portable or mobile radio telephone equipment 6 or 7 is under the control of the PBX 3 is transmitted to the PBX 3. When the position registration is performed, a position registering/calling section 39 stores an address of the radio base station 4 in the system in charge of a zone including the current position of the portable or mobile radio telephone equipment 6 or 7. The public network 1 registers the PBX 3 as the position at which the portable or mobile radio telephone equipment 6 or 7 exists. Thereafter, when a terminal connected to the public network 1 calls the portable or mobile radio telephone equipment 6 or 7, the public network 1 connects the call to the PBX 3 in which the position is registered in response to the call, and the PBX 3 calls the portable or mobile radio telephone equipment 6 or 7 through the radio base station 4 whose address is stored in the PBX 3.

Figure 15:
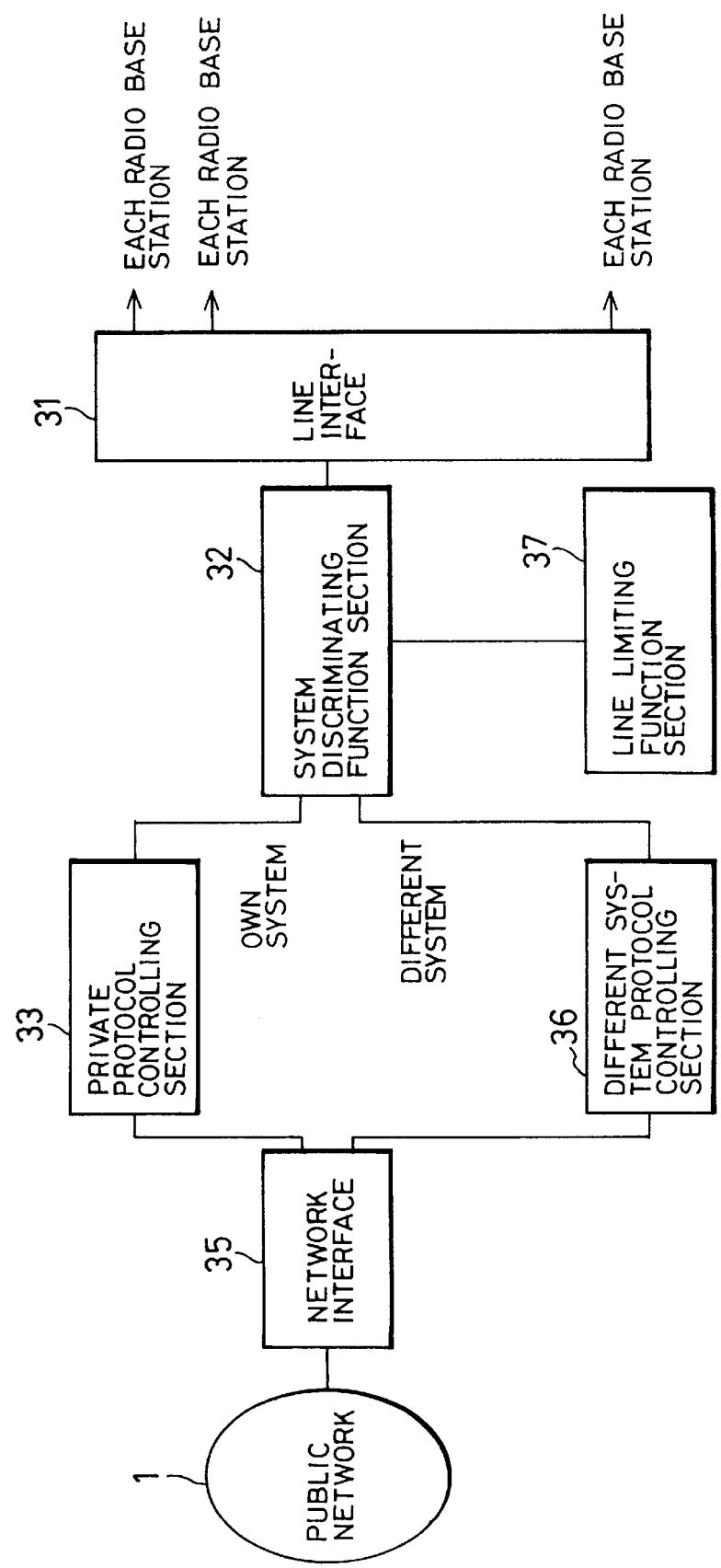
FIG. 15 is a system configuration diagram showing still another embodiment of the private mobile communication system of the present invention.
Figure 16:
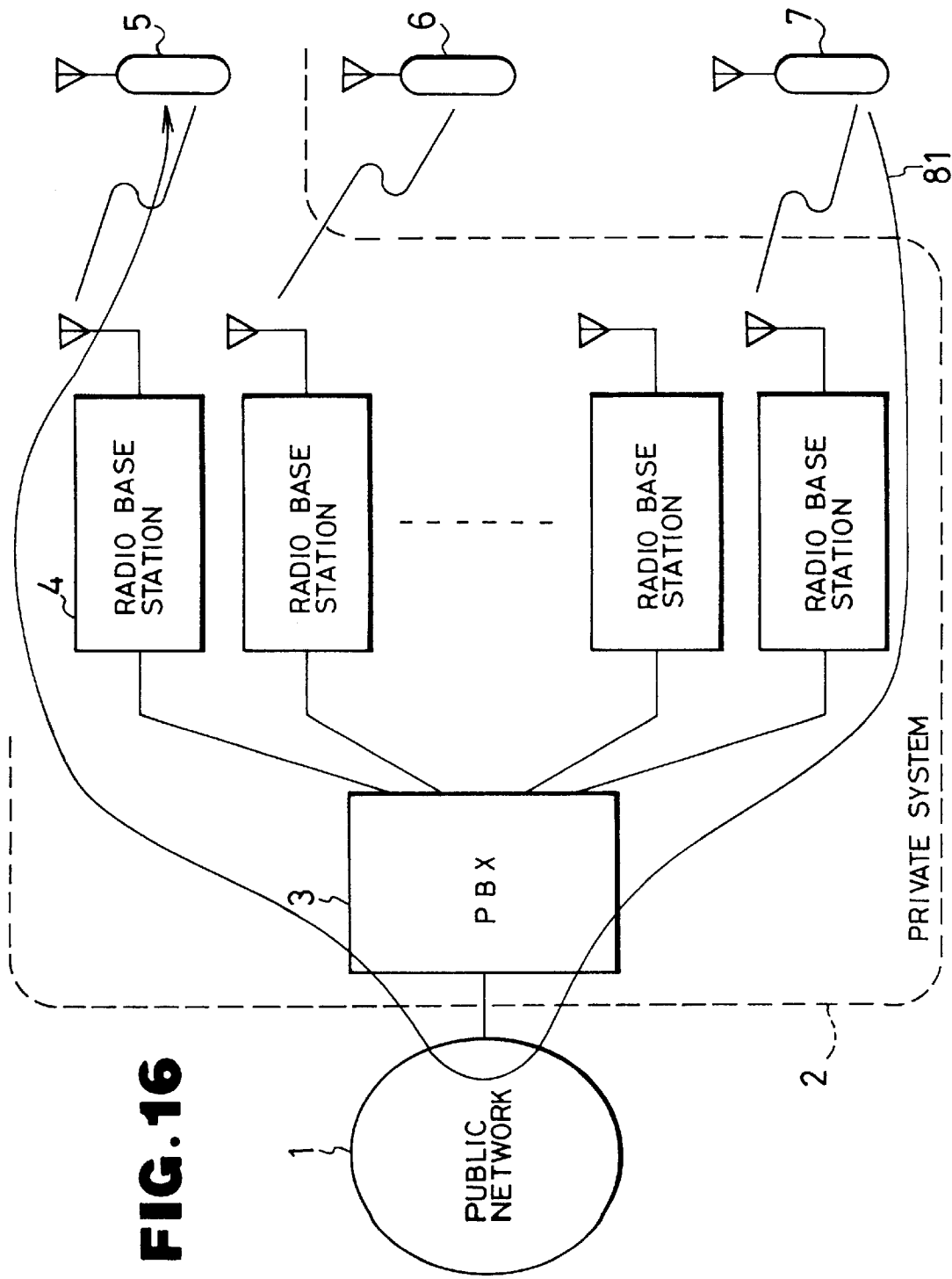
FIG. 16 is an explanatory view showing a flow of a call as an example.

A description will now be given of another embodiment of the present invention with reference to the drawing. FIG. 15 is a functional block diagram showing a configuration of another embodiment of the PBX. In FIG. 15, reference numeral 37 means a circuit limiting function section to restrict a later call to the public network 1 in case 50% line capacity of the radio base station is used for connection to the public network 1. Other component parts are identical with or equivalent to those designated by the same reference numerals in FIG. 11.

A description will now be given of the operation. The circuit limiting function section 37 checks a kind of call which is managed in the respective radio base stations 4. In case a rate of the connection to the public network 1 to the line capacity which can be managed in the respective radio base stations 4 exceeds a predetermined rate, for example, in case 50% line capacity is used for the connection to the public network 1, the later call to the public network 1 is prohibited. Thereby, it is possible to eliminate a risk that any problem occurs in an interconnection n a supplier system due to the excessive connection of the public call to the radio base station 4.

Further, in view of actual circumstances of the respective radio base stations 4, the optimal rate for each radio base station 4 may be set discretely. It is thereby possible to provide great operational flexibility in the system.

Figure 17:
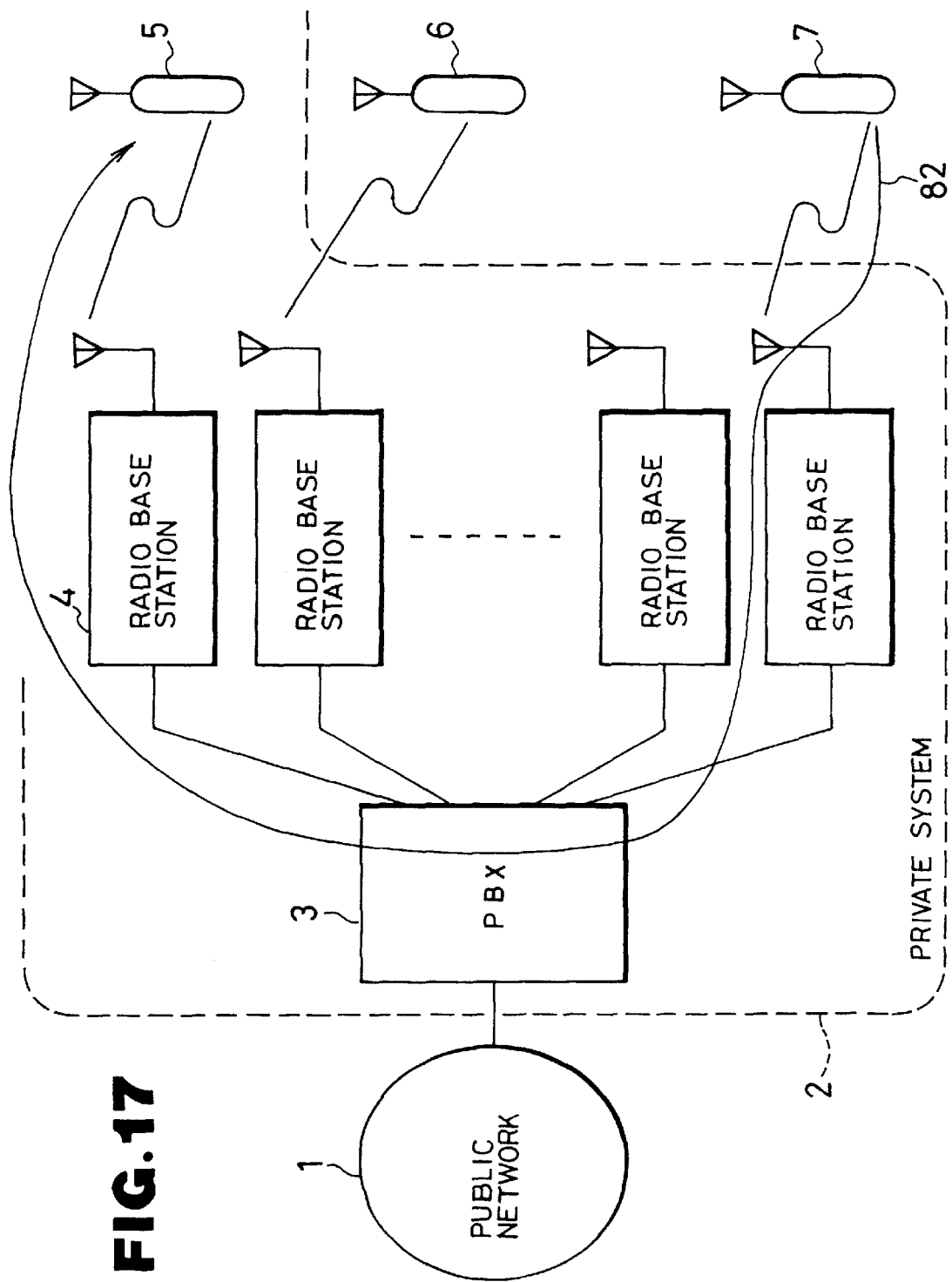
FIG. 17 is an explanatory view showing an improved flow of the call.
Figure 18:
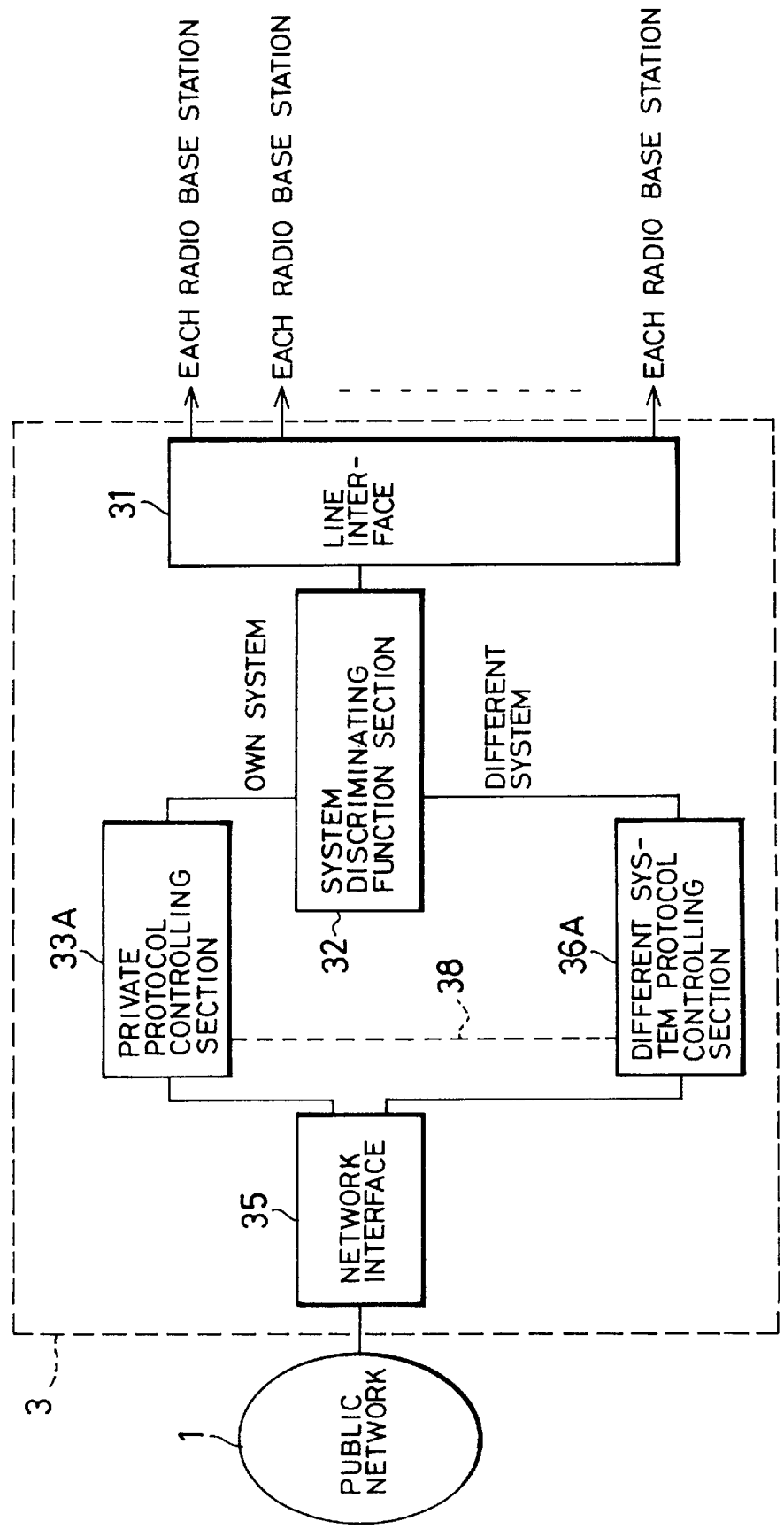
FIG. 18 is a block diagram showing a configuration of the PBX to realize the flow of the call shown in FIG. 17.
Figure 19:
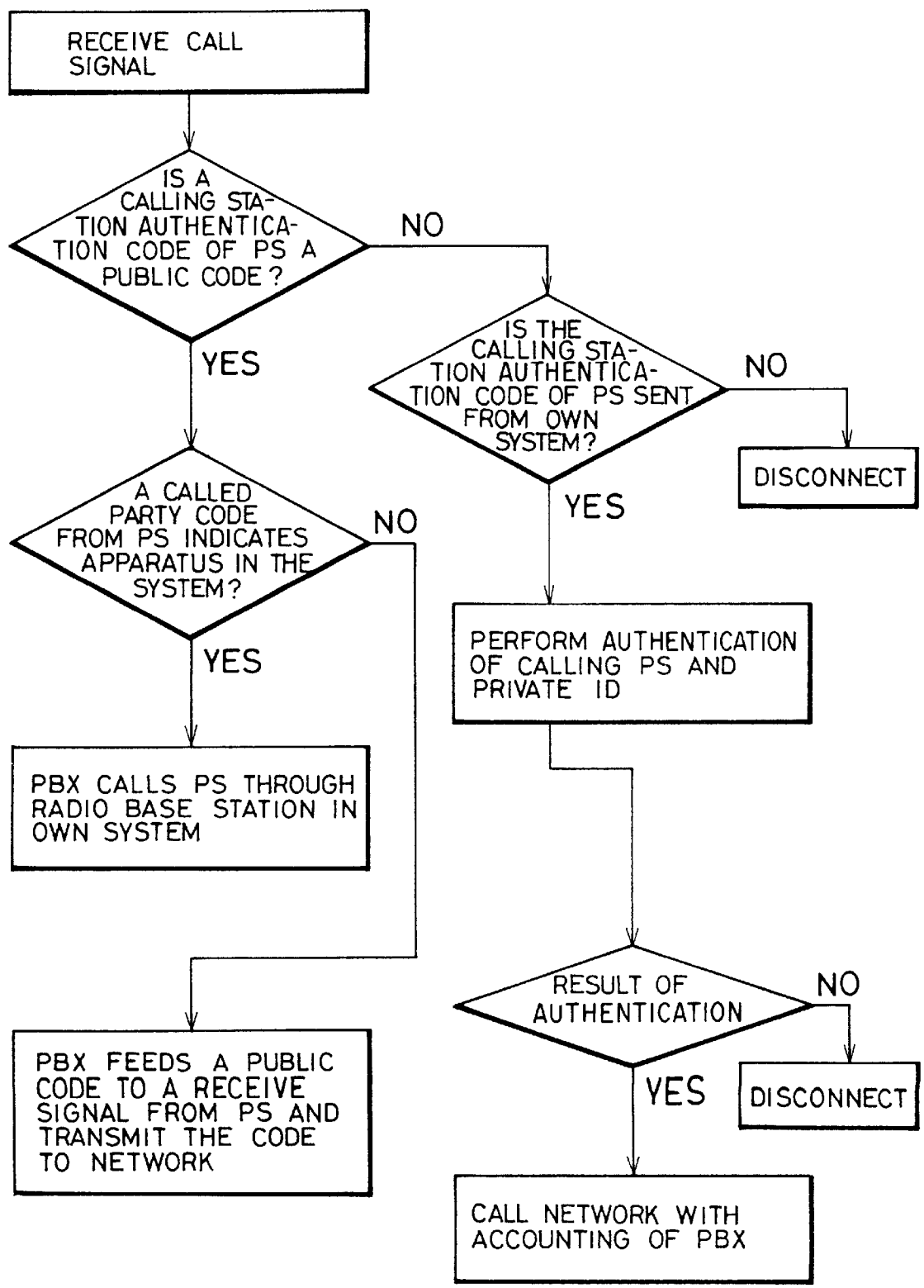
FIG. 19 is a flowchart showing the operation of the PBX shown in FIG. 18.

A description will now be given of still another embodiment with reference to FIGS. 16 to 19. When the portable or mobile radio telephone equipment 7 which does not belong to the system calls the portable or mobile radio telephone equipment 5 that belongs to the system, according to the respective embodiments as set forth above, a signal is sent out to the public network 1 once as shown by a path 81 in FIG. 16. Thereafter, the signal turns back to the system 2 registered in the public network 1, and the system 2 calls the portable or mobile radio telephone equipment 5. However, it is uneconomical to use such a path since two lines between the PBX 3 and the public network 1 are occupied for one communication. A path 82 modified as shown in FIG. 17 can serve as an economical signal path. FIG. 18 shows a configuration of the PBX 3 which can select the path 82. In the PBX 3, a path 38 shown by the dotted line is selected. Specifically, in order to select the path 82, the operation proceeds as shown in a flowchart in FIG. 19. When whether or not the calling station identification code of PS is a public code is discriminated, i.e., when the system discriminating function section 32 of the PBX 3 makes a decision of Yes, the different system protocol controlling section 36A prohibits the call to the public network in case a calling station identification code of PS indicates the portable or mobile radio telephone equipment 5 that belongs to the system. As a result, the call signal is delivered to the private protocol controlling section 33A. The private protocol controlling section 33A can directly transmit the signal to the radio base station 4 in the system, and can call the portable or mobile radio telephone equipment 5. Further, when the portable or mobile radio telephone equipment 5 that belongs to the system calls the portable or mobile radio telephone equipment 6 or 7, it is possible to use the path 38.

While preferred embodiments of the invention have been described using specific terms, such description is for illustrative purposes only, and it is to be understood that changes and variations may be made without departing from the spirit or scope of the following claims.

What is claimed is:

1. A private mobile communication system, comprising:
   a plurality of radio base stations, each including a private protocol processing section for transmitting and receiving private protocol information through a private control channel, a public protocol processing section for transmitting and receiving public protocol information through a private control channel, and a private control channel controlling section for inserting a private control signal into a control slot of a private control channel;

a private exchange connected to said plurality of radio base stations and to a public network, including a private protocol controlling section for processing, using said private protocol, signals transmitted by portable or mobile radio equipment belonging to said private communication system, and a different system protocol controlling section for permitting access to said public network by portable or mobile radio equipment which does not belong to said private communication system, by using said public protocol through said private control channel; and a plurality of portable or mobile radio telephone equipment, which belong to a system different from said private communication system, selected from the group consisting of:

1) portable or mobile radio telephone equipment having a public control channel controlling section for inserting a public control signal into a control slot of a public control channel, a private control channel controlling section for inserting a private control signal into a control slot of a private control channel, a public protocol processing section for processing said public protocol information, and a first switch for connecting said public protocol processing section to either said public control channel controlling section or to said private control channel controlling section, said first switch connecting said public protocol processing section to said private control channel controlling section for passing authentication information pertaining to said portable or mobile radio telephone equipment to said public network through said private exchange for calls being placed to destinations on said public network from within said private communication system; and 2) portable or mobile radio telephone equipment having a public control channel controlling section for inserting a public control signal into a control slot of a public control channel, a private control channel controlling section for inserting a private control signal into a control slot of a private control channel, a public protocol processing section for processing said public protocol information, a private protocol processing section for controlling said private protocol information, a second switch for connecting said private control channel controlling section to either said private protocol processing section or said public protocol processing section, and a third switch for connecting said public control channel controlling section to said public protocol processing section, said second switch connecting said private control channel controlling section to said public protocol processing section for passing authentication information pertaining to said portable or mobile radio telephone equipment to said public network through said private exchange for calls being placed to destinations on said public network from within said private communication system, said second switch connecting said private control channel controlling section to said private protocol processing section for connecting itself to the telephones within said private communication system.

2. A private mobile communication system, comprising:

a plurality of radio base stations each including a private protocol processing section to transmit/receive private protocol information through a private control channel, and a public protocol processing section to transmit/receive public protocol information through a private control channel;

a private exchange connected to said plurality of radio base stations and to a public network, said private exchange including a private protocol controlling section for processing a signal transmitted by a portable or mobile radio telephone equipment that belongs to said private system by using said private protocol, and a different system protocol controlling section for permitting access to said public network by a portable or mobile radio telephone equipment which belongs to said private system based a signal transmitted using said public protocol through said private control channel;

a plurality of portable or mobile radio telephone equipment, which belong to said private communication system, selected from the group consisting of:

1) portable or mobile radio telephone equipment having a private control channel controlling section for inserting a private control signal into a control slot of a private control channel, and a private protocol processing section for processing said private protocol information; and 2) portable or mobile radio telephone equipment being registered to have a public subscriber telephone number for personal use, having a public control channel controlling section for inserting a public control signal into a control slot of a public control channel, a private control channel controlling section for inserting a private control signal into a control slot of a private control channel, a public protocol processing section for processing said public protocol information, a private protocol processing section for controlling said private protocol information, a first switch for connecting said private control channel controlling section to either said private protocol processing section or said public protocol processing section, and a second switch for connecting said public control channel controlling section to said public protocol processing section, said first switch connecting said private control channel controlling section to said public protocol processing section for passing authentication information pertaining to said portable or mobile radio telephone equipment to said public network through said private exchange for calls being placed to destinations on said public network from within said private communication system; wherein said private exchange includes a position registering/calling section which stores an identification number of a radio base station covering a zone corresponding to a current position of said portable or mobile radio telephone equipment of group (2) upon performance of a position registration of said portable or mobile radio telephone equipment of group (2), and when there is an incoming call from said public network to said portable or mobile radio telephone equipment, said private exchange calls said portable or mobile radio telephone equipment through the radio base station corresponding to the identification number stored in said exchange.

* * * * *